(12) United States Patent
Hondou (10) Patent No.: US 7,827,393 B2
(45) Date of Patent: Nov. 2, 2010

(54) BRANCH PREDICTION APPARATUS, ITS METHOD AND PROCESSOR

(75) Inventor: Mikio Hondou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 28 days.

(21) Appl. No.: 11/515,971

(22) Filed: Sep. 6, 2006

(65) Prior Publication Data

US 2007/0005945 A1 Jan. 4, 2007

Related U.S. Application Data

(63) Continuation of application No. PCT/JP2005/007557, filed on Apr. 20, 2005.

(30) Foreign Application Priority Data

Apr. 21, 2004 (JP) ............................. 2004-125465

(51) Int. Cl.
*G06F 9/00* (2006.01)
(52) U.S. Cl. ...................... 712/239; 712/240
(58) Field of Classification Search ................. 712/239, 712/240
See application file for complete search history.

(56) References Cited

U.S. PATENT DOCUMENTS

| | | | | |
|---|---|---|---|---|
| 4,943,908 | A | * | 7/1990 | Emma et al. ................. 712/240 |
| 5,519,841 | A | * | 5/1996 | Sager et al. .................. 711/202 |
| 5,553,253 | A | | 9/1996 | Pan et al. |
| 5,729,726 | A | * | 3/1998 | Levine et al. ................ 712/233 |
| 2002/0194460 | A1 | * | 12/2002 | Henry et al. ................. 712/238 |
| 2002/0199091 | A1 | | 12/2002 | Tago et al. |
| 2007/0150712 | A1 | * | 6/2007 | Ali et al. ..................... 712/239 |

FOREIGN PATENT DOCUMENTS

| | | |
|---|---|---|
| JP | 6-28184 A | 2/1994 |
| JP | 10-240526 A | 9/1998 |
| JP | 2002-163150 A | 6/2002 |
| JP | 2003-5956 A | 1/2003 |

OTHER PUBLICATIONS

Supplemental European Search Report in EP 05 73 4503, mailed Apr. 2, 2008.
Juan T, et al., "Dynamic History-Length Fitting: A Third Level of Adaptivity for Branch Prediction", Proceedings of the 25th Ann. Intl. Symposium on Computer Architecture, ISCA '98, Barcelona, Jun. 27- Jul. 1, 1998; Ann. International Symposium on Computer Architecture, Los Alamitos, CA; IEEE Computer Soc., US, Jun. 27, 1998, pp. 155-166, XP000849913; ISBN: 0-8186-8492-5.

(Continued)

*Primary Examiner*—Aimee J Li
(74) *Attorney, Agent, or Firm*—Fujitsu Patent Center (57) ABSTRACT

A branch prediction apparatus reads out a branch history table 15 by an index calculated by the output of a branch history register 14 containing a plurality of the latest branch result of a branch instruction. The branch prediction apparatus comprises frequency detection units 18-20 for detecting the appearance frequency of a branch instruction with a different address and data width modification units 16 and 21 for modifying the number of valid bits of the branch history register, based on the detected appearance frequency. Even a program in which a branch result strongly depends on the latest branch history or even a program having a plenty of branch instructions can maintain high prediction accuracy with a small capacity of the branch history table.

9 Claims, 9 Drawing Sheets

OTHER PUBLICATIONS

Stark J., et al., "Variable Length Path Branch Prediction", ACM Sigplan Notices, ACM, Assoc. for Computing Machinery, NY, NY, US, vol. 33, No. 11, Nov. 1998, pp. 170-179, XP000787306, ISSN: 0362-1340.

Tarlescu, M-D, et al., "Elastic History Buffer: A Low-Cost Method to Improve Branch Prediction Accuracy", Proceedings of the Intl. Conference on Computer Design, VLSI in Computers and Processors, ICCD '97, Austin, TX, Oct. 12-15, 1997, Los Alamitos, CA: IEEE, US, Oct. 12, 1997, pp. 82-87, XP000799852, ISBN: 0-8186-8207-8.

Duesterwald, E., et al., "Characterizing and Predicting Program Behavior and Its Variability", Parallel Architectures and Compilation Techniques, 2003. Pact 2003, Proceedings 12th International Conference on Sep. 27-Oct. 1, 2003, Piscataway, NJ, USA; IEEE Sep. 27, 2003, pp. 220-231, XP010662190, ISBN: 0-7695-2021-9.

"European official communication (Article 94(3) EPC)", European Appln No. 05734503.5.

"European official communication", mailed Jun. 25, 2009 from EU Patent Office, for corresponding EU Patent Application No. 05734503.5.

* cited by examiner

| BIT WITH OF BRANCH HISTORY REGISTER | SPEC BENCHMARK (SPECint) % | SPEC BENCHMARK (SPECfp) % | TPC-C % |
|---|---|---|---|
| 0 | 1.351 | 0.073 | 2.137 |
| 2 | 1.194 | 0.066 | 2.123 |
| 4 | 1.050 | 0.054 | 2.126 |
| 8 | 0.869 | 0.031 | 2.230 |
| 12 | 0.799 | 0.028 | 2.384 |

FIG. 2

RELATED ART

| BIT WITH OF BRANCH HISTORY REGISTER | SPEC BENCHMARK (SPECint/fp) % | TPC-C % |
|---|---|---|
| 7 | 0.006-2.163 | 2.208 |

F I G. 5

| SPEC BENCHMARK (SPECint/fp) % | TPC-C % |
|---|---|
| 0.00–0.56 | 1.06 |

F I G. 6

F I G. 7

| SPEC BENCHMARK (SPECint)     % | SPEC BENCHMARK (SPECfp)     % | TPC-C % |
|---|---|---|
| 0.786 | 0.030 | 2.124 |

F I G. 8

BRANCH PREDICTION APPARATUS, ITS METHOD AND PROCESSOR

CROSS REFERENCE TO RELATED APPLICATION

This application is a continuation of PCT application PCT/JP2005/007557 which was filed on Apr. 20, 2005.

BACKGROUND OF THE INVENTION

1. Field of the Invention

The present invention relates to a technology for branch predicting, using a branch history register storing a plurality of the latest branch result of a branch instruction and a branch history table storing prediction information indicating a probability of predicting that the branch instruction branches, for each index.

2. Description of the Related Art

A processor with a pipeline function is designed to predict whether a branch instruction branches by a branch prediction apparatus in order to maximize the function and to advance a process. If the prediction fails, the process must be advanced backward. This means that the proceeded process is wasted and a back process must be performed separately. Since there is such a penalty, its prediction accuracy greatly affects the performance of the processor. Therefore, the branch prediction apparatus strongly requires that the prediction can be performed with a higher accuracy.

As the conventional branch prediction apparatus, for example, a two-level type branch prediction apparatus is disclosed in patent reference 1. The type of branch prediction apparatus is focused since fairly high prediction accuracy can be expected of it.

Figure 1A:
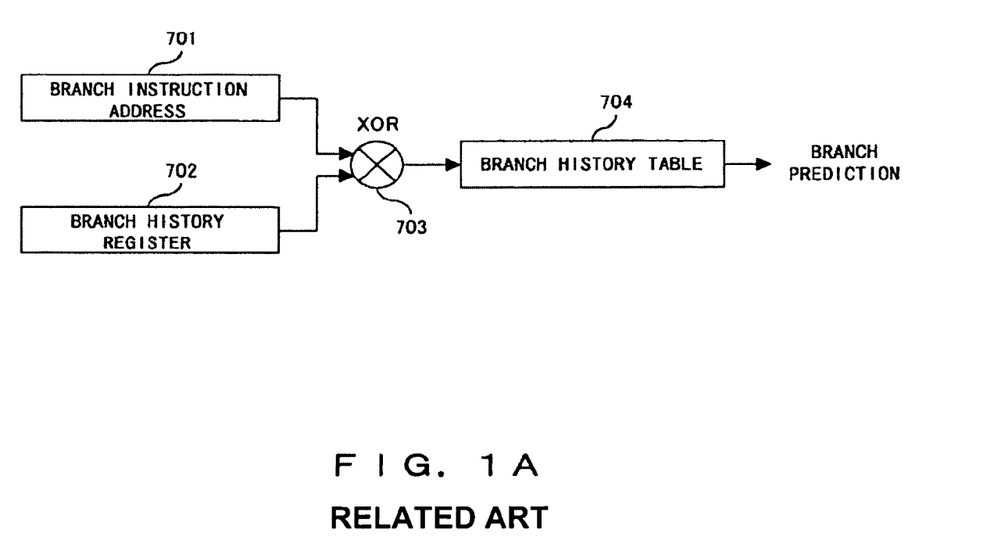
FIG. 1A explains branch prediction performed by the conventional two-level type branch prediction apparatus.

FIG. 1A explains branch prediction performed by the conventional two-level type branch prediction apparatus.

A branch history register 702 stores a plurality of branch results of the latest branch instruction as history. The branch result of one branch instruction is expressed by one bit value. For example, not taken and taken are expressed by "0" and "1", respectively. The branch result is stored in the branch register 702 while being shifted one bit by one bit. Thus, the branch register 702 stores the latest branch result for the number of the bits. For example, if the register 702 whose number of bits is four and whose current contents is "1001" and executes taken of a branch instruction, the contents is updated to "1001".

An exclusive logical OR (XOR) calculation circuit 703 calculates the exclusive logical OR of the contents stored in a branch history table 704 and a branch instruction address value 701. The exclusive logical OR is used as the index of the branch history table 704.

The branch history table 704 stores a state, which is prediction information, indicating the probability of predicating that a branch instruction is taken for each index. The state (prediction information) is expressed by two bits. It indicates that the larger a value expressed by the two bits is, the higher the probability of taken is. Thus, if the value is "11" or "10", it is predicted taken by a branch instruction succeeds. If the value is "01" or "10", it is predicted that not taken.

Figure 1B:
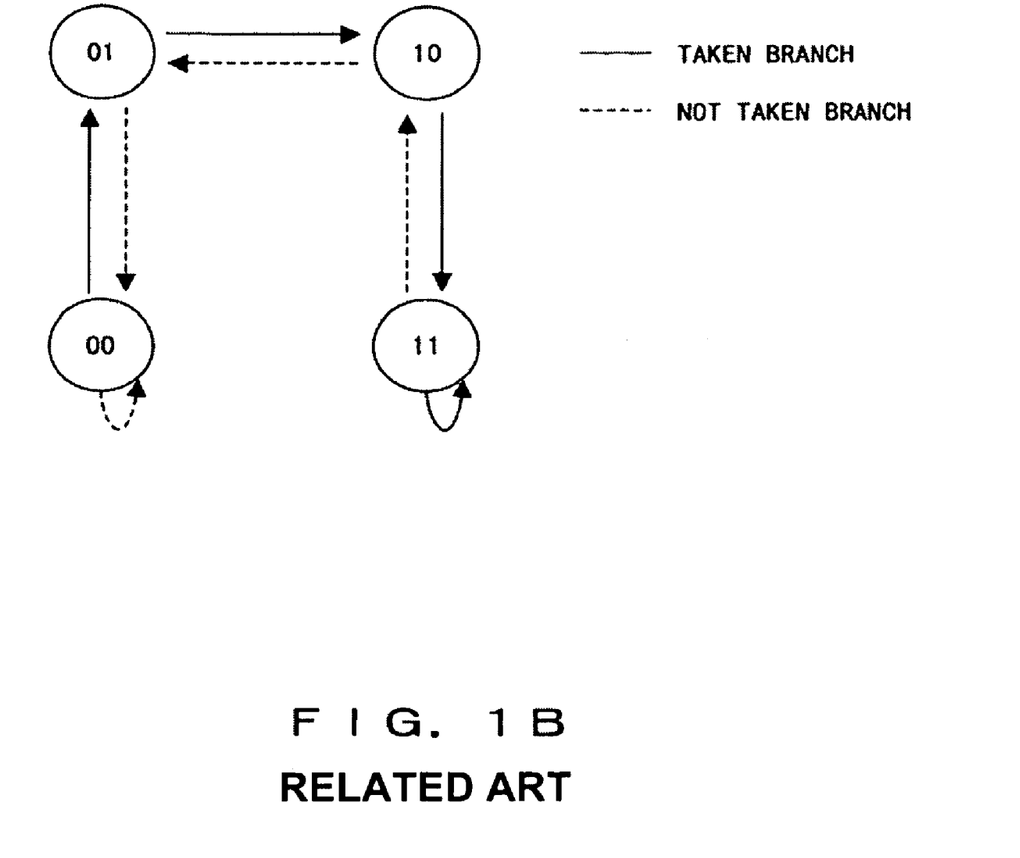
FIG. 1B explains how to update a state in which the contents are stored in the branch history table 704.

FIG. 1B explains how to update a state in which the contents are stored in the branch history table 704.

The value as a state is updated according to an actual branch result. As shown in FIG. 1B, if taken, the value is updated by incrementing it with "11" as the upper limit. If not taken, the value is updated by decrementing it with "00" as the lower limit. Thus, the branch history table 704 is optimized according to a program to execute, thereby always maintaining the prediction accuracy high.

The performance of a processor is usually measured by conducting a benchmark test. For software for the test, a standard performance evaluation corporation (SPEC) benchmark, a transaction processing performance council (TPC)-C benchmark and the like are known.

The SPEC benchmark includes a SPECint for the performance evaluation of an integer operation, a SPECfp for the performance evaluation of a floating-point operation and the like as an index indicating the performance of a processor. However, the TPC-C benchmark is used to simulate a transaction processing system to evaluate the performance of a processor.

Figure 2:
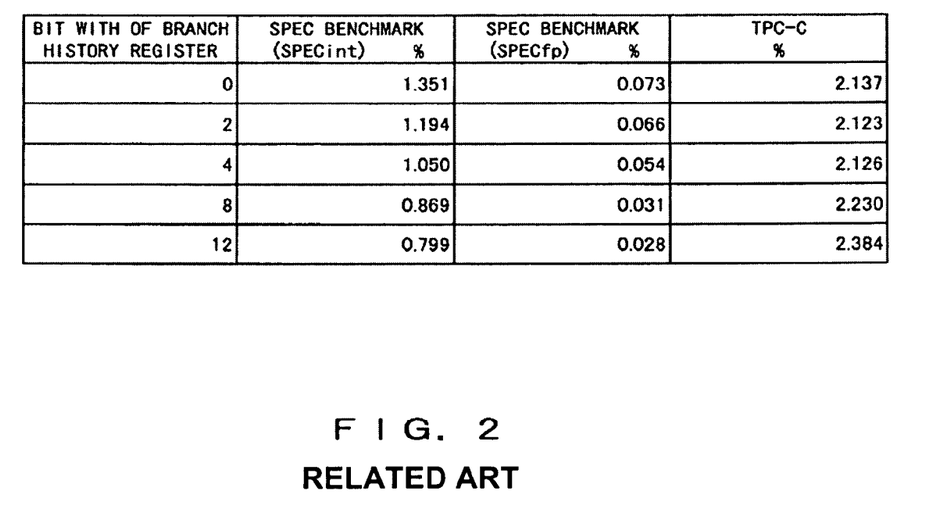
FIG. 2 shows the relationship between the data width of the branch history register 702 and the error rate of branch prediction for each benchmark.

FIG. 2 shows the relationship between the data width of the branch history register 702 and the error rate of branch prediction for each benchmark. The error rate is an average.

As shown in FIG. 2, in the two-level type branch prediction apparatus, the larger the data width (figure) of the branch history register 702 is, the lower the error rate in the SPEC benchmark becomes and the higher the error rate of the TPC-C benchmark becomes. Thus, in a processor provided with the branch prediction apparatus, the larger the data width (figure) of the branch history register 702 is, the higher the performance in the SPEC benchmark becomes and the lower the error rate of the TPC-C benchmark becomes, which is a contradictory problem.

As to the feature of each benchmark, in the SPEC benchmark, although an instruction string strongly depending on the branch/non-branch history of the latest branch instruction exists, the number of branch instructions is not fairly small. However, in the TPC-C benchmark, prediction hardly depends on the branch/non-branch history of the latest branch instructions, the number of branch instructions is not fairly large in the TPC-C benchmark. Therefore, it can be considered to modify the data width of the branch history register 702 according to such features.

As described above, the index of the branch history table 704 is the XOR of the value of the branch history register 702 and the branch instruction address value 701 (G-share). Therefore, the larger the data width of the branch history register 702 is, the larger an area in the branch history table 704, occupied by the branch instruction prediction information of the branch instruction address value 701 becomes. In this case, the number of branch instructions that can be stored without being shared with another branch instruction decreases. Thus, if the data width of the branch history register 702 is increased, in the SPEC benchmark with a fairly small number of branch instructions, even when the number of branch instructions that can store prediction information without sharing it with another branch instruction is small, prediction information can become independently stored for each history pattern (combination of branch/non-branch) and the prediction accuracy is improved. However, in the TPC-C benchmark, although the number of branch instructions is fairly large, the number of branch instructions that can store prediction information independently decreases and the prediction accuracy decreases.

Patent reference 2 discloses a branch prediction apparatus capable of performing branch prediction by a plurality of methods and using one of them for actual branch prediction. Patent reference 3 discloses a processor for measuring performance in the case where a module performs various processes and modifying the configuration.

In any of the technologies disclosed in patent references 2 and 3, the branch prediction error rate is focused. However, the error rate sometimes increases because the prediction accuracy itself of the branch prediction apparatus is low. Therefore, there is a possibility that such technologies are not suited to correspond to such features (appearance frequency of a branch instruction) of the program (benchmark).

Patent reference 1: Japanese Patent Application Publication No. 2003-5956

Patent reference 2: Japanese Patent Application Publication No. H10-240526

Patent reference 3: Japanese Patent Application Publication No. 2002-163150

SUMMARY OF THE INVENTION

It is an object of the present invention to provide a branch prediction apparatus capable of always maintaining high prediction accuracy and a processor provided with it.

The branch prediction apparatus of the present invention presumes that the branch prediction is performed a branch history register for storing a branch result of a branch instruction and a branch history table for storing prediction information indicating the probability of predicting if a branch instruction is taken, for each index calculated using the branch results stored in the branch history register, and comprises a frequency detection unit for detecting the appearance frequency of a branch instruction with a different address each other and a data width modification unit for dynamically modifying the valid data width of the branch history register, based on the appearance frequency detected by the frequency detection unit.

The branch prediction method of the present invention presumes that the branch prediction is performed a branch history register for storing a branch result of a branch instruction and a branch history table for storing prediction information indicating the probability of predicting if a branch instruction is taken, for each index calculated using the branch results that are stored in the branch history register, and comprises detecting the appearance frequency of a branch instruction with a different address and dynamically modifying the valid data width of the branch history register, based on the detected appearance frequency.

The processor of the present invention presumes that the branch prediction is performed a branch history register for storing a branch result of a branch instruction and a branch history table for storing prediction information indicating the probability of predicting if a branch instruction is taken, for each index calculated using the branch results that are stored in the branch history register, and comprises a frequency detection unit for detecting the appearance frequency of a branch instruction with a different address and a data width modification unit for dynamically modifying the valid data width of the branch history register, based on the appearance frequency detected by the frequency detection unit.

In the present invention, the appearance frequency of a branch instruction with a different address is detected, and the valid data width of the branch history register for storing branch result of branch instruction as history, based on the detection appearance frequency is dynamically modified from time to time.

The appearance frequency of a branch instruction with a different address varies depending on a program, and the optimal data width of the branch history register also varies depending on the appearance frequency. Therefore, the data width can be optimized by dynamically modifying the data width of the branch history register from time to time, based on the appearance frequency. As a result, high prediction accuracy can be always maintained, regardless of a program to execute, thereby always displaying the most of the performance of a processor.

DESCRIPTION OF THE PREFERRED EMBODIMENTS

The preferred embodiments of the present invention are described in detail below with reference to the drawings.

Figure 3:
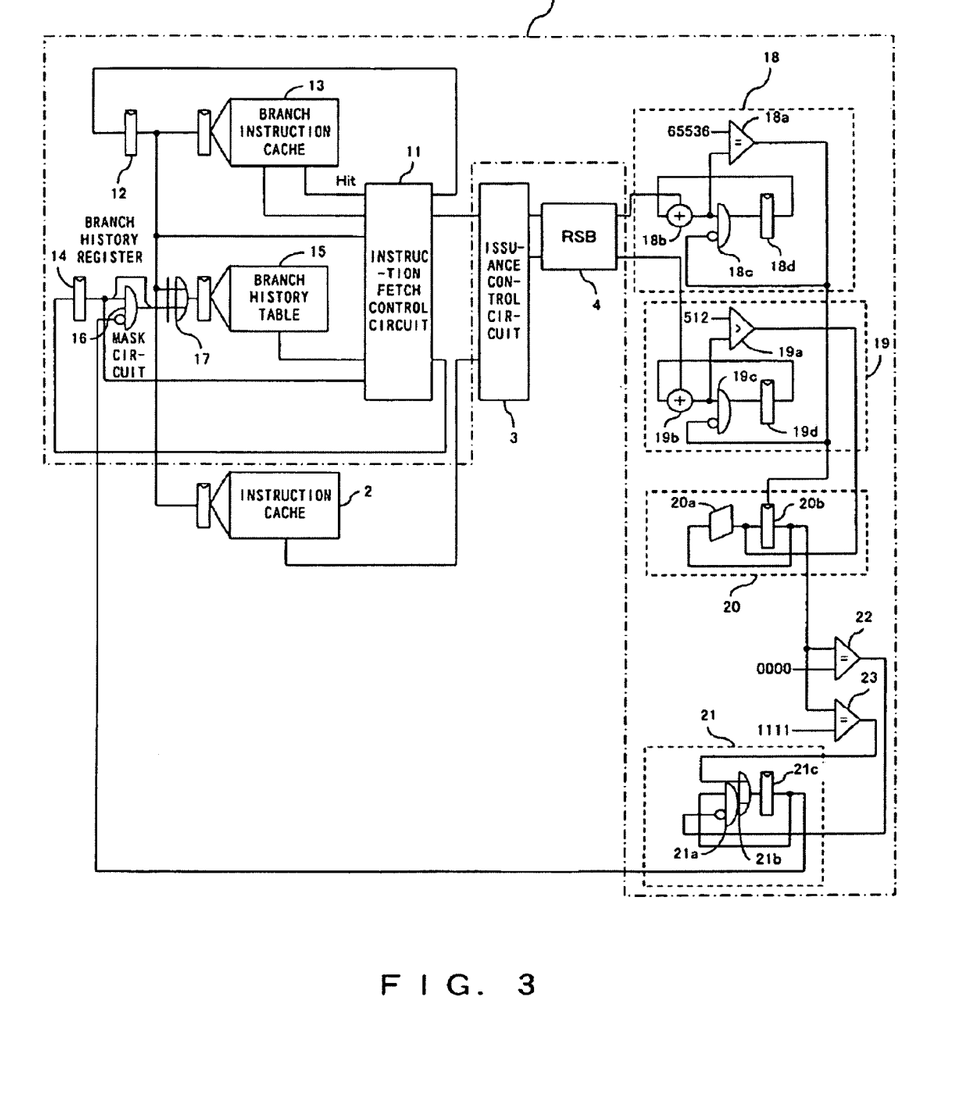
FIG. 3 shows the configuration of the branch prediction apparatus of this preferred embodiment.
Figure 4:
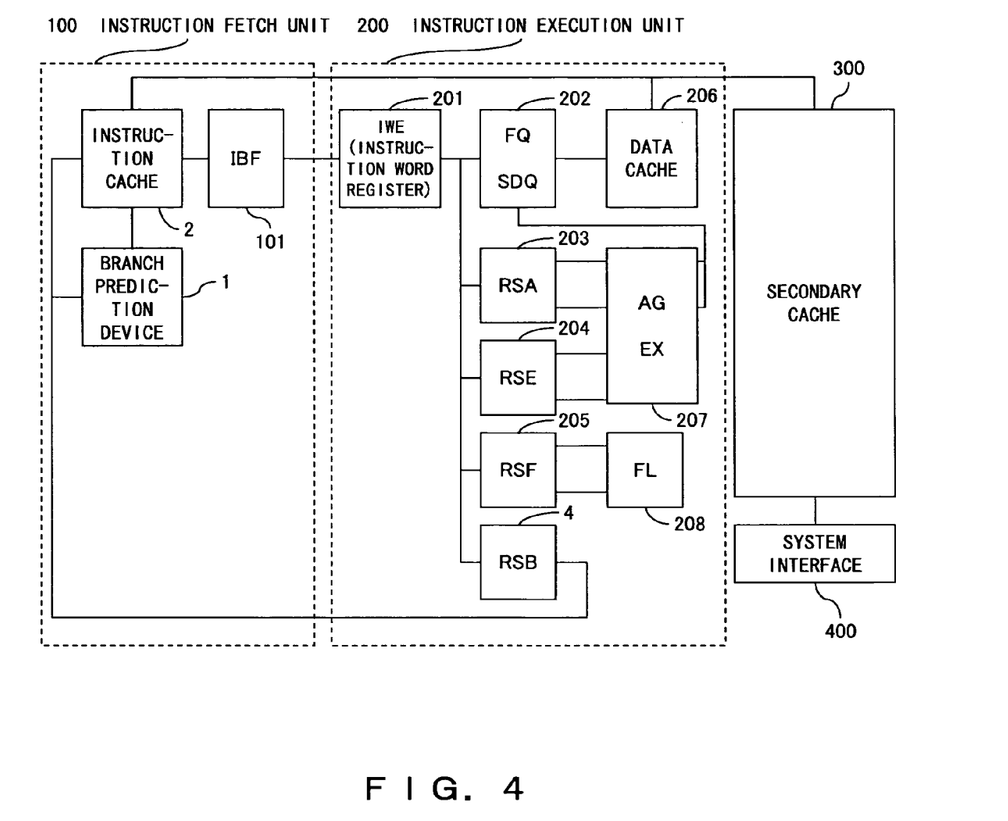
FIG. 4 shows the configuration of a processor provided with the branch prediction apparatus of this preferred embodiment.

FIG. 3 shows the configuration of the branch prediction apparatus of this preferred embodiment. FIG. 4 shows the configuration of a processor provided with the branch prediction apparatus.

As shown in FIG. 4, the processor comprises an instruction fetch unit 100, an instruction execution unit 200, a secondary cache unit 300 and a system interface unit 400.

The instruction fetch unit 100 comprises a branch prediction apparatus 1, instruction cache 2 and an instruction buffer (IBF) 101. The instruction fetch unit 100 operates independently of the instruction execution unit 200. The instruction fetch unit 100 traces the instruction cache 2, extracts an instruction string to predict in the future from it and takes it in the IBF 101. Instructions are pre-fetched to the instruction cache 2 by hardware or software.

The instruction execution unit 200 extracts and executes the instructions pre-fetched in the IGF 101. For example, four instructions are set at the same time in an instruction word register (IWR) unit 201 from the IBF 101.

The IWR unit 201 comprises an issuance control circuit 3 (FIG. 3) for decoding the instructions extracted from the IBF 101, determining resources needed to execute them and issuing the instructions. The issuance control circuit 3 assigns instruction identifiers (IID) and issues the instructions. The issued instruction is sent out to any of a reservation station for load and store (RSLS) 202, a reservation station for address generation (RSA) 203, a reservation station for execution (RSE) 203, a reservation station for floating points (RSF) 205 and a reservation station for branch (RSB) 4 (FIG. 3).

The RSLS 202 controls data cache 206 used by a fetch queue (FQ) to execute a load instruction. A store instruction controls to write data by a store data queue (SDQ).

An operational circuit 207 comprises two address generation operational circuits (AG) and two integer operational circuits (EX). The RSA 203 makes the address generation operational circuit execute an instruction to generate an address. The generated address is entried to the store data queue of the RSLS 202. The RSE 204 makes the integer operational circuit execute an instruction.

Similarly, two floating-point operational circuits (FL) 208 are provided. The RSF 205 makes the floating-point operational circuit 208 execute an instruction.

A branch instruction is issued to the RSB 4. The RSB 4 performs processes, such as branch determination, branch prediction information update, instruction re-fetch at the time of branch prediction error and the like. The branch determination is performed by monitoring an operational operation, using an instruction identifier assigned to an instruction.

Next, the branch prediction apparatus 1 constituting the instruction fetch unit 100 is described in detail with reference to FIG. 3.

The branch instruction cache 13 stores tag information indicating the type of an instruction and branch destination addresses for each branch instruction address. Such information is read out by a value (address) outputted from a program counter 12. An instruction fetch control circuit 11 inputs information read out from the branch instruction cache 13 to recognize the type and the like of an instruction to pre-fetch subsequently. The instruction fetch control circuit 11 determines whether a cache error occurs, based on the existence/non-existence of a branch destination address. The instruction read out from the instruction cache 2 by the value outputted from the program counter 12 is sent to the issuance control circuit 3 of the IWR unit 201 via the IBF 101. The occurrence of a cache error is notified to the RSB 4 directly or indirectly. An instruction re-fetch by the RSB 4 in the case where a branch prediction error is detected is performed by directly updating the contents of the program counter 12 and the like. Alternatively, it is performed by controlling the instruction fetch control circuit 11.

A branch history register 14 stores a plurality of the latest branch result of a branch instruction as history. The instruction fetch control circuit 11 updates the contents, for example, by a branch determination notice from the RSB 4. The update is performed together with the update of the corresponding state of a branch history table 15.

The branch history table 15 stores a state, being prediction information indicating a probability that taken by a branch instruction, for each index. The state (prediction information) is expressed by two bits. The index is calculated by the exclusive logical OR (XOR) of the address outputted from the program counter 12 and the value of the branch history register 14.

The value read out from the branch history register 14 is outputted to each of a mask circuit 16 and an exclusive logical OR (XOR) operational circuit 17. The mask circuit 16 comprises logical product operational circuits for a data width to mask if necessary (hereinafter called "mask-target data width") of the total data width of the branch history register 14. Each of those logical product operational circuits outputs the logical product of the corresponding bit value of the branch history register 14 and the inverted one of a signal value outputted by a branch history register mode register unit (hereinafter called "mode register unit") 21. Thus, to the exclusive logical OR (XOR) operational circuit 17, a value for a data width not outputted to the mask circuit 16, of the total data width of the branch history register 14 is outputted. For example, if the total data width of the branch history register 14 is 10 bits, the mask-target data width is 8 bits.

The XOR operational circuit 17 calculates the exclusive logical OR of the value inputted from the branch history register 14 or the mask circuit 16 and the address value read out from the program counter 12 in units of bits and outputs the result to the branch history table 15 as an index. The instruction fetch control circuit 11 predicts whether branch by a branch instruction occurs, according to the state (prediction information) read out from the branch history table by the index. The instruction stored in the instruction cache 2 is pre-fetched by the prediction result and is sent to the issuance control circuit 11 via the IBF 101. The instruction to pre-fetch is the instruction stored in the address indicated by the program counter 12 if not taken is predicted and one stored in the corresponding branch destination address stored in the branch instruction cache 13 if taken is predicted.

A branch instruction number counter unit 18 counts the number of completely executed branch instructions.

A comparator 18a compares the output value of an adder 18b with a prescribed value (65536 here), and makes its output signal H if they coincide with each other. The adder 18b adds the value of a register 18d and a value outputted by the RSB 4 (1 here) by the branch instruction completion notice outputted by the RSB 4 and outputs the addition result. The addition result is outputted to a logical product operational circuit 18c in addition to the comparator 18a. The logical product operational circuit 18c calculates the logical product of the addition result and the inverted one of the output signal of the comparator 18a in units of bits. The result is stored in the register 18d. Since the inverted output signal of the comparator 18a is inputted to the logical product operational circuit 18c, the value stored in the register 18d, whose output signal is H, becomes 0. Thus, the branch instruction number counter unit 18 counts the number of the times of the branch instruction completion notices outputted by the RSB 4 until the comparator 18a changes the output signal to H the next time after changing it to H. A branch instruction cache error number counter unit 19 counts the number of cache errors caused in the branch instruction cache 13 while the prescribed number of branch instructions are executed.

A comparator 19a compares the output value of an adder 19b with a prescribed value (512 here), and makes its output signal H if the output value exceeds the prescribed value. The adder 19b adds the value of a register 19d and a value outputted by the RSB 4 (1 here) by the branch instruction cache error notice outputted by the RSB 4 and outputs the addition result. The addition result is outputted to a logical product operational circuit 19c in addition to the comparator 19a. The logical product operational circuit 19c calculates the logical product of the addition result and the inverted one of the output signal of the comparator 18a of the branch instruction number counter unit 18 in units of bits. The result is stored in the register 19d. Since the inverted output signal of the comparator 18a is inputted to the logical product operational circuit 19c, the value stored in the register 19d, whose output signal is H, becomes 0. Thus, the branch instruction number counter unit 18 counts the number of the times of the branch instruction completion notices outputted by the RSB 4 until the comparator 18a changes the output signal to H the next time after changing it to H. The branch instruction cache error number counter unit 19 counts the number of cache errors caused in the branch instruction cache 13 while the prescribed number of branch instructions are executed.

A branch instruction cache error rate threshold-exceeding flag buffer unit (hereinafter called "buffer unit") 20 stores a plurality of the past signal values of the comparator 19a in the case where the comparator 18a makes its output signal H. In this preferred embodiment it is assumed that ones for the past four times are stored.

A shifter 20a shifts a value stored in a register 20b by one bit. When the output signal of the comparator 18a becomes H, a register 20b stores a value obtained after the shifter 20a shifts. The signal of the comparator 19a is inputted to the register 20b as a bit value without having a value to shift and is stored in it. Thus, if the output signal of the comparator 18a becomes H while each value of the four bits in the register 20b is "0110" and the signal value of the comparator 19a is "1", "1101" is newly stored in the register 20b.

A comparator 22 compares the value of the register 20b with a four-bit value "0000", and makes its output signal H if they coincide with each other. Similarly, a comparator 23 compares the value of the register 20b with a four-bit value "1111", and makes its output a signal H if they coincide with each other. The output signal H of the comparator 22 means that 512 or more cache errors occur consecutively four or more times while 65536 branch instructions are executed. The output signal H of the comparator 23 means that 512 or less cache errors occur consecutively four or more times while 65536 branch instructions are executed.

A mode register unit 21 comprises a logical product operational circuit 21a, a logical OR operational circuit 21b and a register 21c. The output signal of the comparator 22 is inverted and inputted to the logical product operational circuit 21b. The logical product operational circuit 21b calculates the logical product of the inverted output signal and the value of the register 21c. Thus, if the value of the register 21c is "1" and the output value of the comparator 22 is "0", the calculation result becomes "1".

The calculation result of the logical product operational circuit 21 is outputted to the logical OR operational circuit 21b. The logical OR operational circuit 21b calculates the logical OR of the calculation result and the output value of the comparator 23. The calculation result is stored in the register 21c. If either of the respective output values of the logical product operational circuit 21a and the comparator 23 is "1", the calculation result becomes "1".

The value stored in the register 21c is inverted and is inputted to the mask circuit 16. If the output value of the comparator 22 becomes "0" or the output value of the comparator 23 becomes "0" when "1" is stored in the register 21c, the value becomes "1". If the output of the comparator 23 becomes "0" and also the output value of the comparator 23 becomes "1", the "1" becomes "0".

Thus, in this preferred embodiment, the occurrence of a cache error in the branch instruction cache 13 is focused, and the data width of the branch history register 14 is dynamically changed for the following reasons.

Figure 5:
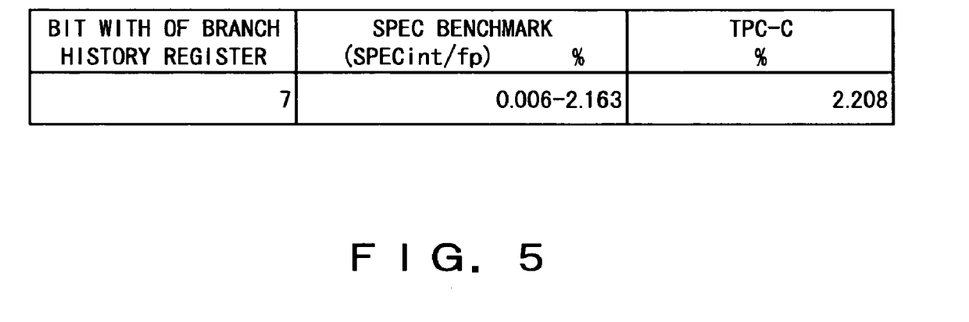
FIG. 5 shows the relationship between a benchmark and a branch prediction error rate.

FIG. 5 shows the relationship between a benchmark and a branch prediction error rate. The relationship is obtained when the data width of the branch history register 14 is 7 bits.

From the viewpoint of a branch prediction error rate, since in the SPEC benchmark, prediction strongly depends on the branch/non-branch history of the latest branch instructions, the prediction about whether a branch instruction actually branches becomes complex. Therefore, the branch prediction error rate greatly varies depending on the type of the SPEC benchmark and is distributed from the lower to the higher.

However, in the TPC-C benchmark, prediction does not depend on the branch/non-branch of the latest branch instructions so much, the prediction about whether a branch instruction actually branches becomes fairly simple. However, since the appearance frequency of a branch instruction with a different address is high, the non-storage of tag information corresponding to the branch instruction cache 13 and the like easily occurs. Due to the capacity shortage of the branch history table 15, the number of branch instructions that can store a state (prediction information) independently also decreases. Thus, actually the branch prediction error rate often increases. Therefore, it is very difficult to determine which the program is, the SPEC benchmark or TPC-C benchmark.

In programs other than the benchmark, the accuracy of the branch prediction itself of the two-level type branch prediction apparatus sometimes low. It is very difficult to accurately determine such affinity by the branch prediction error rate. For such a reason, it is very difficult to adopt the appearance frequency of the branch instruction with a different address as an index (information). If the branch prediction error rate is focused and the data width of the branch history register 14 is modified, it is found by simulation that there is a possibility that the modification control cannot be stably exercised. Specifically, there is a possibility that if the data width is made smaller for the reason that the branch prediction error rate is high, the error rate decreases. However, if the decrease of the data width frequently modifies the data width in order to increase the data width. Such instability is not preferable.

From the viewpoint of the cache error rate of the branch instruction cache 13, since in the SPEC benchmark, the number of branch instructions is fairly small, the cache error rate is low. Conversely, in the TPC-C benchmark, the number of branch instructions is fairly large, the cache error rate is high. Therefore, by focusing on the cache error, the appearance frequency of a branch instruction with a different address in the program can be accurately predicted.

Figure 6:
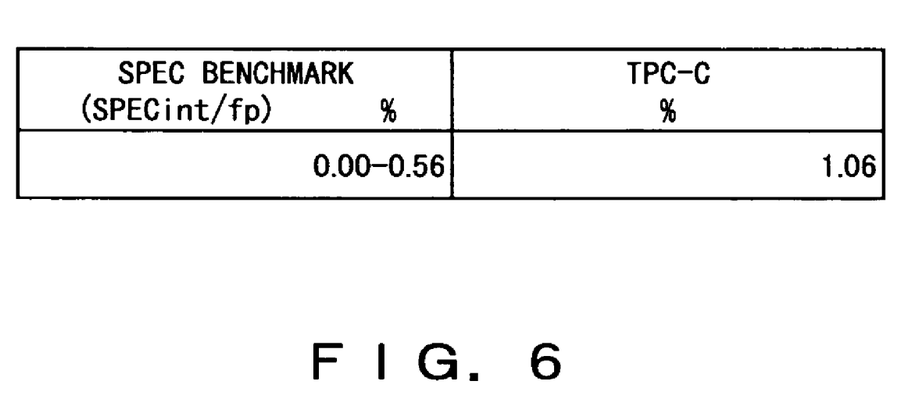
FIG. 6 shows the relationship between a benchmark and a branch instruction cache error rate.

FIG. 6 shows the relationship between a benchmark and a branch instruction cache error rate.

As shown in FIG. 6, there is a distinct difference in the branch instruction cache error rate between the SPEC benchmark and the TPC-C benchmark. Therefore, by focusing on the cache error, the data width can be dynamically and accurately modified according to the appearance frequency of a branch instruction. Thus, when the SPEC benchmark or the TPC-C benchmark is considered as the program, in both of them, the maximum performance can be displayed.

Figure 8:
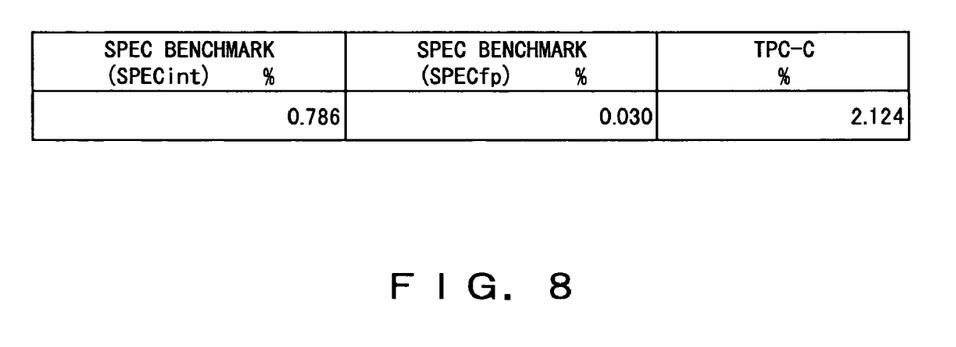
FIG. 8 shows the relationship between a benchmark and a branch prediction error rate in the case where the valid data width of the branch history register is dynamically modified.

FIG. 8 shows the relationship between a benchmark and a branch prediction error rate in the case where the valid data width of the branch history register 14 is dynamically modified.

By focusing on the branch instruction cache error and dynamically modifying the data width, as shown in FIG. 8, the branch prediction error rate of each benchmark can be suppressed to a low level, compared with the case where it is not modified (FIG. 5). Therefore, the more performance can be displayed regardless of the type of the benchmark.

Figure 7:
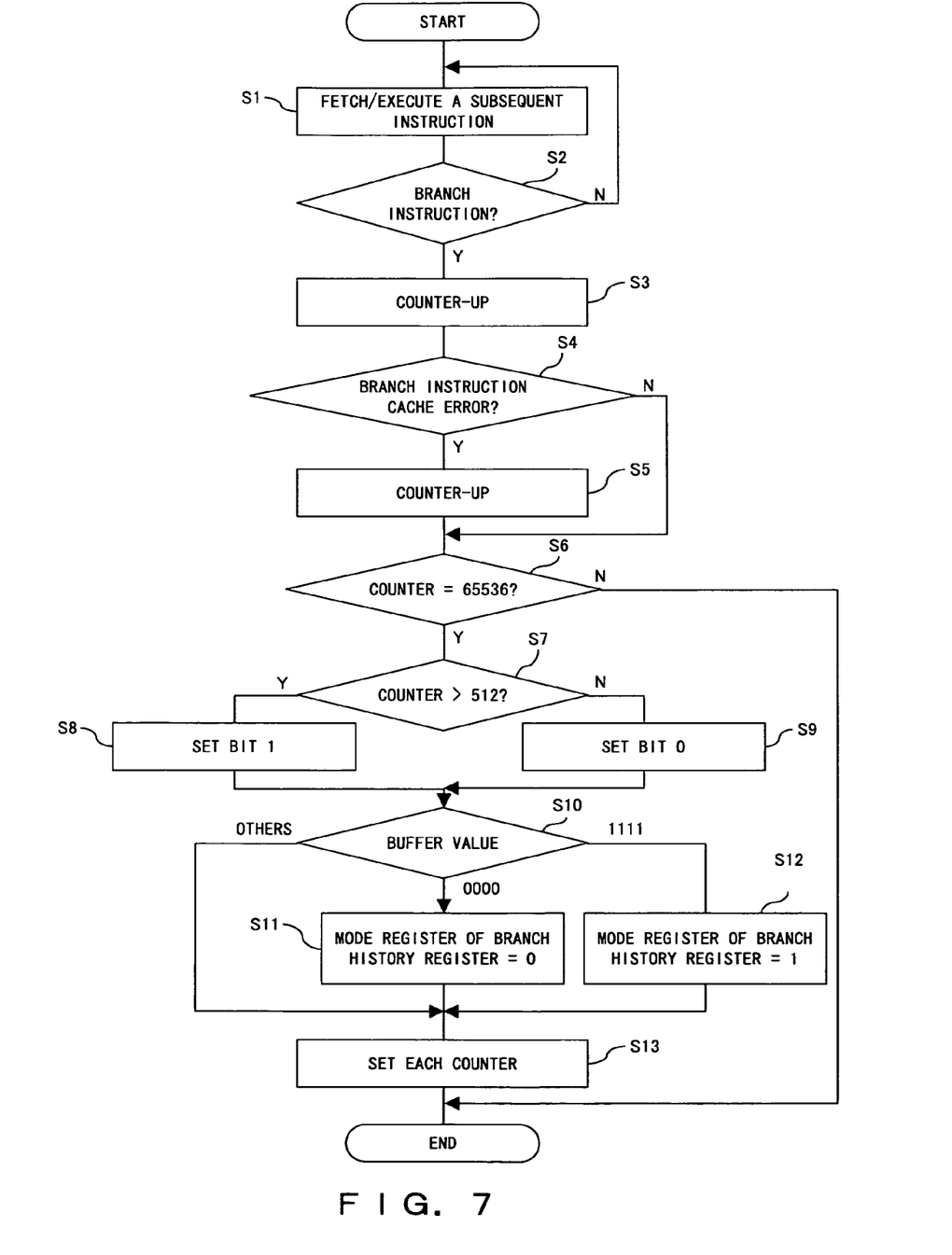
FIG. 7 is a flowchart showing the flow of the operation of the branch prediction apparatus of this preferred embodiment.

FIG. 7 is a flowchart showing the flow of the operation of the branch prediction apparatus 1 of this preferred embodiment. In FIG. 7, the dynamic modification of the valid data width of the branch history register 14 is focused and the operation of each unit related to it and a series of its flows is shown. Next, the operation of the branch prediction apparatus 1 is described in detail with reference to FIG. 7.

Firstly, in step S1, the RSB 4 fetches and executes a subsequent instruction. The issuance control circuit 3 issues the instruction. After executing the fetched instruction, the flow proceeds to step S2 and it is determined whether the instruction is a branch instruction. If the executed instruction is a branch instruction, the determination is yes and the flow proceeds to step S3. If not, the determination is no and the flow returns to step S1.

In step S3, the branch instruction completion notice is outputted to the branch instruction number counter unit 18, and the adder 18*b* increments a value stored in the register 18*d*. In step S4, it is determined whether there is a branch instruction cache error. If the occurrence of the error is notified by the instruction fetch control circuit 11, the determination is yes. Then, in step S5, the cache error notice is outputted to the branch instruction cache error number counter unit 19, and the adder 19*b* increments the value stored in the register 19*d*. Then, the flow proceeds to step S6. If not, the determination is no, and the flow proceeds to step S6.

Steps S6 through S12 can be realized by the respective automatic operations of the counter units 18 and 19, the buffer unit 20, the mode register unit 21 and the comparators 22 and 23.

Firstly, in step S6, the comparator 18*a* compares the addition result of the adder 18*b* with a prescribed value of 65536. If they coincide with each other, the determination is yes, and the flow proceeds to step S7. If not, the determination is no, and the series of operations is terminated.

In step S7, the comparator 19*a* compares the addition result of the adder 19*b* with a prescribed value of 512. If the addition result is larger than 512, the determination is yes and the flow proceeds to step S8 to set the output value of one bit to "1". Then, the flow proceeds to step S10. If not, the determination is no, and the flow proceeds to step S9 to set the output value to "0". Thus, the flow proceeds to step S10 while the output value is maintained "0".

In step S10, the comparators 22 and 23 determine whether the four-bit value stored in the register 20*b* of the buffer 20*b* is any of "0000", "1111" and the other. If it is determined that the value is "0000", in step S11 "0" is stored in the register 21*c* of the mode register unit 21, and then the flow proceeds to step S13. If it is determined that the value is "1111", in step S12 "1" is stored in the register 21*c*, and then the flow proceeds to step S13. If the value is the other, the flow proceeds to step S13.

In step S13, the respective values of the registers 18*d* and 19*d* are made "0" by the RSB 4 outputting a branch instruction completion notice and a cache error notice to the branch instruction number counter unit 18 and the branch instruction cache error number counter unit 19, respectively. Then, the series of operations are terminated.

Although in this preferred embodiment, the data width of the branch history register 14 is reduced according to whether the branch instruction cache error rate consecutively exceeds a threshold (error rate whose number of cache errors is larger than 512 of the 65536 branch instructions) four or more times, there is no need to give such a times condition. Namely, if the error rate exceeds the threshold, the data width can also be immediately reduced. Alternatively, the times of exceeding the threshold can be counted within the predetermined times, and if the counted times exceeds the prescribed value, the data width can be reduced. It can also be determined whether the data width should be reduced by its size instead of whether the error rate exceeds the threshold. Alternatively, a method other than them can be adopted. These also apply to the case where the data width is increased.

Although as information indicating the appearance frequency of a branch instruction with a different address, the branch instruction error rate is focused, information other than it can also be focused. For example, the product of the instruction cache error rate and the appearance frequency of a branch instruction, and the product can also be used instead of the cache error rate. The cache error rate can also be an error rate of a different type of cache. Namely, it can correspond to the type of adopted cache.

The appearance frequency of a branch instruction with a different address varies depending on a program, and sometimes a program to execute can be sequentially switched by a context switch. Thus, the detection result of the appearance frequency and the data width information of a valid (applied) branch history register 14 can also be stored in units of contexts, and they can also be corresponded to the modification of contexts. In such a case, the maximum performance can be displayed more quickly. Then, the branch history table 15 is prevented to become dirty.

The addresses of branch instructions whose appearance frequency is considered are different. The index of the branch history table 15 varies depending on the address. Therefore, the detection result of the appearance frequency of a branch instruction with a different address and the data width information of a valid (applied) branch history register 14 can also be stored, and the data width to apply of the branch history register 14 can also be modified according to the index of the address of an instruction to fetch.

Although the valid data width of the branch history register 14 is modified in two steps, it can also be modified in more steps. In that case, the data width can be sequentially modified gradually according to the appearance frequency of a branch instruction with a different address. Alternatively, the data width can be selected according to the size of the appearance frequency.

What is claimed is:

1. A branch prediction apparatus for predicting branch instruction, using a branch history register for storing a branch result of a branch instruction and a branch history table for storing prediction information indicating the probability of predicting if a branch instruction is taken for each index calculated, using the branch results stored in the branch history register, comprising:
    a frequency detection unit to detect an appearance frequency of a branch instruction in different addresses, the appearance frequency being detected for every predetermined number of branch instructions; and
    a data width modification unit to dynamically modify a valid data width of the branch history register, using a plurality of consecutive appearance frequencies detected by the frequency detection unit.

2. The branch prediction apparatus according to claim 1, wherein
    the data width modification unit reduces the data width if the appearance frequency detected by the frequency detection unit exceeds a prescribed value a plurality of consecutive times, and increases the data width if the appearance frequency is below the prescribed value a plurality of consecutive times.

3. The branch prediction apparatus according to claim 1, wherein
    the frequency detection unit detects a cache error rate of cache storing tag information indicating existence/non-existence of a branch instruction as the appearance frequency.

4. A branch prediction method for predicting branch instruction, using a branch history register for storing a branch result of a branch instruction and a branch history table for storing prediction information indicating the probability of predicting if a branch instruction is taken for each index calculated, using the branch results stored in the branch history register, the method comprising:
    detecting an appearance frequency of a branch instruction in different addresses, the appearance frequency being detected for every predetermined number of branch instructions; and dynamically modifying a valid data width of the branch history register, using a plurality of consecutive detections of the detected appearance frequency.

5. The branch prediction method according to claim 4, wherein the dynamically modifying includes:
reducing the data width if the detected appearance frequency exceeds a prescribed value a plurality of consecutive times; and
increasing the data width if the detected appearance frequency is below the prescribed value a plurality of consecutive times.

6. The branch prediction method according to claim 4, wherein the detecting includes:
treating a cache error rate as being the appearance frequency, the cache error rate representing the rate at which a cache stores tag information indicating existence/non-existence of a branch instruction.

7. A processor for predicting branch instruction, using a branch history register for storing branch results of a branch instruction and a branch history table for storing prediction information indicating the probability of predicting if a branch instruction is taken for each index calculated, using the branch results stored in the branch history register, the processor comprising:

a frequency detection unit to detect an appearance frequency of a branch instruction in different addresses, the appearance frequency being detected for every predetermined number of branch instructions; and
a data width modification unit to dynamically modify a valid data width of the branch history register, using a plurality of consecutive appearance frequencies detected by the frequency detection unit.

8. The processor according to claim 7, wherein the data width modification unit is further operable to:
reduce the data width if the detected appearance frequency exceeds a prescribed value a plurality of consecutive times; and
increase the data width if the detected appearance frequency is below the prescribed value a plurality of consecutive times.

9. The processor according to claim 7, wherein the frequency detection unit is further operable to:
treat a cache error rate as being the appearance frequency, the cache error rate representing the rate at which a cache stores tag information indicating existence/non-existence of a branch instruction.

* * * * *